United States Patent [19]
Thompson

[11] Patent Number: 6,091,803
[45] Date of Patent: Jul. 18, 2000

[54] ARCHITECTURE FOR ROBUST VOICE CTI

[75] Inventor: Graham H. Thompson, Kanata, Canada

[73] Assignee: Mitel Corporation, Kanata, Canada

[21] Appl. No.: 09/177,972

[22] Filed: Oct. 26, 1998

Related U.S. Application Data

[63] Continuation of application No. 08/529,441, Sep. 18, 1995, abandoned.

[30] Foreign Application Priority Data

Sep. 15, 1995 [CA] Canada ................................. 2158408

[51] Int. Cl.[7] .......................... H04M 11/04; H04M 1/24; H04M 11/00; H04M 1/00
[52] U.S. Cl. ......................... 379/37; 370/271; 370/524; 379/27; 379/34; 379/93.01; 379/372; 379/386; 379/419
[58] Field of Search ............................. 358/442; 370/216, 370/225, 271, 420, 421, 463, 524; 379/93.01, 93.08, 93.11, 100.05, 100.15, 100.16, 372, 386, 419, 442, 443, 23, 27, 34, 37

[56] References Cited

U.S. PATENT DOCUMENTS

| | | | |
|---|---|---|---|
| 4,484,031 | 11/1984 | Gray et al. | 379/212 |
| 4,653,085 | 3/1987 | Chan et al. | 370/524 X |
| 4,860,342 | 8/1989 | Danner | 379/93.28 |
| 4,964,065 | 10/1990 | Hicks et al. | 395/200.56 |
| 5,023,868 | 6/1991 | Davidson et al. | 370/524 X |
| 5,065,425 | 11/1991 | Lecomte et al. | 379/93.05 |
| 5,469,441 | 11/1995 | Hesdahl et al. | 370/524 |
| 5,631,954 | 5/1997 | Evans et al. | 379/201 |

FOREIGN PATENT DOCUMENTS

| | | | |
|---|---|---|---|
| 2278754A | 12/1994 | United Kingdom | H04M 1/00 |
| 2284126A | 5/1995 | United Kingdom | H04M 1/00 |
| 2296622A | 7/1996 | United Kingdom | H04M 1/00 |

*Primary Examiner*—Harry S. Hong
*Attorney, Agent, or Firm*—Pascal & Associates

[57] ABSTRACT

A computer controlled telephone apparatus comprised of a processor controlled telephone set, apparatus for interfacing the telephone set to a telephone network, a computer for interfacing the telephone set, comprising a stored telephony service program for receiving call control signals from the apparatus for interfacing the telephone set to the telephone network, and for controlling operation of functions of the telephone set in accordance with the stored telephony service program; and monitoring apparatus in the telephone set for monitoring operation of the telephony service program and in the event there is no operation of the controlling program, for causing direct connection of the telephone set to the apparatus for interfacing the telephone set to the telephone network.

6 Claims, 5 Drawing Sheets

ARCHITECTURE FOR ROBUST VOICE CTI

This application is a continuation of application Ser. No. 08/529,441 filed Sep. 18, 1995, now abandoned.

FIELD OF THE INVENTION

This invention relates to telephony and in particular to an architecture and method for enhancing the operation of a telephone by means of a computer in a failsafe manner.

BACKGROUND TO THE INVENTION

Computer telephony integration (CTI) is a term used to describe a general architecture in which functions traditionally provided by a telephone switching system are provided to some degree by personal computers and/or computer servers which are not dedicated to switching and telephony applications alone. CTI provides means for efficiently providing human machine interfaces (HMIs) to telephone users, and thus which can provide new and enhanced features and more ease of use for new and enhanced features than in the past.

CTI has been provided by two well known and basic architectures referred to as first party call control. As shown simply in FIG. 1, first party call control involves interfacing a personal computer 1 between a telephone set 3 and a telephone switching system. The telephone set 3 is connected to the switching system 5 via the computer 1. A significant benefit of this scheme is that the computer is in control of the telephone at all times, and can provide an excellent and seamless HMI.

For example, the computer may be programmed to set up a regular conference at 4:00 pm. Not noticing the time, a user may try to make a call using the telephone in the usual manner. Because the telephone is connected to the computer, the computer program could display a warning, and could present the alternatives of postponing the conference call or postponing the new call.

In some cases the electronic portions of the telephone are to some degree implemented within the chassis of the computer, and only the handset or headset of the telephone is attached outside the computer.

Unfortunately, the computer may lose power, or more commonly, crash (freeze). In either case, voice telephony is likely to be lost. In addition, in the event the computer is being serviced, voice telephone service is unavailable to the user.

Many computer users have switched from use of a desktop computer to use of a laptop or notepad computer. Such machines have very limited expansion capacity, and thus are difficult to design to handle first party call control. In addition, such computers are often stored, and are not available for telephony use.

FIG. 2 illustrates an architecture of another system for implementing first party call control. In this case the telephone is connected directly to the switching system. The computer is connected to the telephone line in a manner similar to an extension telephone.

While in first party call control as shown in FIG. 2 voice communication is essentially as reliable as if no computer had been used, this architecture has the disadvantage that seamless operation cannot be provided, and the HMI is very poor. Relating to the operation example given above, the user would be presented with a confusing situation, since by the time that the computer would present a display of the call progress alternatives, the telephone would already have seized a line circuit in the switching system, and the possibility of remotely setting up the conference call would be blocked.

The form of call control involving use of a personal computer to provide an enhanced HMI and enhanced services in telephony thus provides a significant dilemma, since personal computers have a reputation with some users as being unreliable. It is believed that voice service is seen by most people as being the single most critical form of communication in a multimedia environment; users may be prepared to lose a data connection for a period of time, but will not accept the loss of voice communications. As noted above, the first method of first party call control described above cuts off voice communications in the event of computer failure, while the second method provides a poor HMI and very limited call control capability.

SUMMARY OF THE INVENTION

The present invention is an architecture and method for providing first party call control, with uninterrupted basic telephony service should the computer fail. The desirable seamless integration of functions activated using the telephone is achieved, as well as functions activated directly or indirectly by the computer.

In the present invention, the telephone is physically connected between the switching system and the computer, as in the structure described with reference to FIG. 2, but logically, provided the computer is operational, the computer is connected between the switching system and the telephone, as in the structure described with reference to FIG. 1. In the event of computer failure, the logical connection of FIG. 1 falls back to the physical connection of FIG. 2.

Thus with operation of the computer, the advantages of the structure of FIG. 1 are achieved, with an excellent HMI, seamless control of the call by the computer, etc. However in the event of failure of the computer, the physical architecture of FIG. 2 is reverted to, with direct connection of the telephone to the switching system.

This is achieved by the use of a watch-dog or other program or structure within the telephone which monitors the computer to determine whether or not its application operating the telephone is operational, e.g. whether the computer has crashed.

In accordance with an embodiment of the invention, a computer controlled telephone apparatus is comprised of a processor controlled telephone set, apparatus for interfacing the telephone set to a telephone network, a computer for interfacing the telephone set, comprising a stored telephony service program for receiving call control signals from the apparatus for interfacing the telephone set to the telephone network, and for controlling operation of functions of the telephone set in accordance with the stored telephony service program; and monitoring apparatus in the telephone set for monitoring operation of the telephony service program and in the event there is no operation of the controlling program, for causing direct connection of the telephone set to the apparatus for interfacing the telephone set to the telephone network.

In accordance with another embodiment, a method of operating a computer controlled telephone set is comprised of transmitting telephone call signalling signals to an enhanced services controller, controlling the telephone set by the enhanced services controller, monitoring operation of the enhanced services controller and in the event of detection that the enhanced services controller is not operational, controlling the telephone set directly by said signalling signals.

BRIEF INTRODUCTION TO THE DRAWINGS

A better understanding of the invention will be obtained by reading the description of the invention below, with reference to the following drawings, in which:

FIGS. 1 and 2 are block diagrams of computer controlled architectures using first party call control, FIG. 3 is a block diagram illustrating a computer controlled architecture in accordance with the present invention, FIG. 4 is a block diagram illustrating the computer controlled architecture in accordance with the present invention in more detail, FIG. 5 illustrates computer software control hierarchy for operation of the architecture of the present invention in accordance with a preferred embodiment of the present invention, and FIG. 6 is a block diagram illustrating the present invention as used in a home office environment.

DETAILED DESCRIPTION OF THE PREFERRED EMBODIMENT

Figure 1:
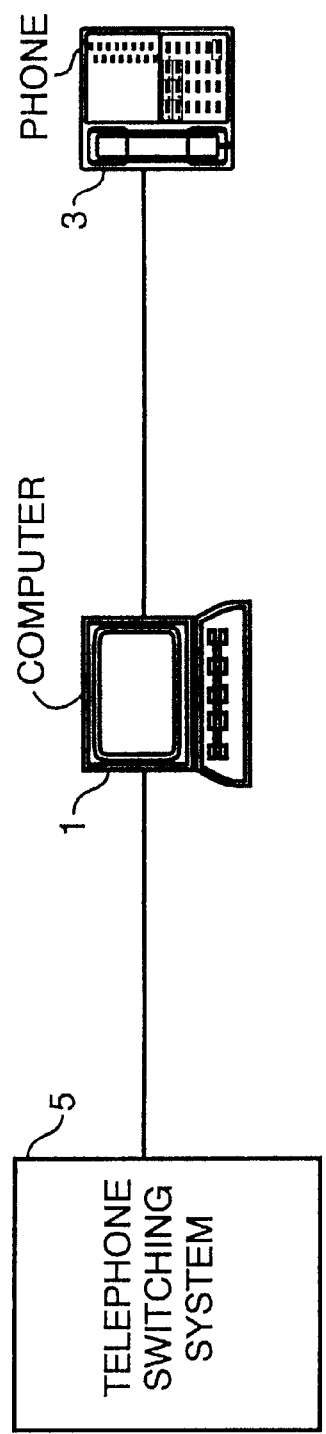
Figure 2:
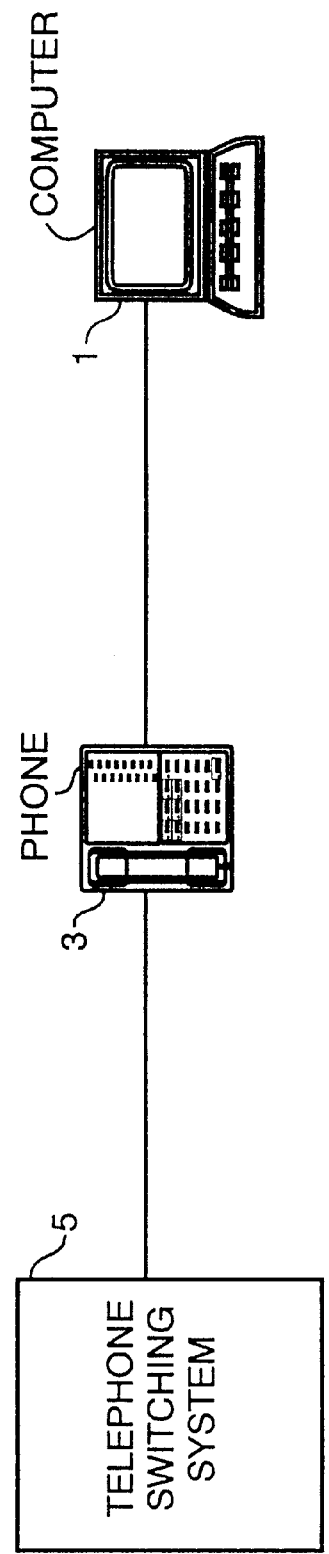
Figure 3:
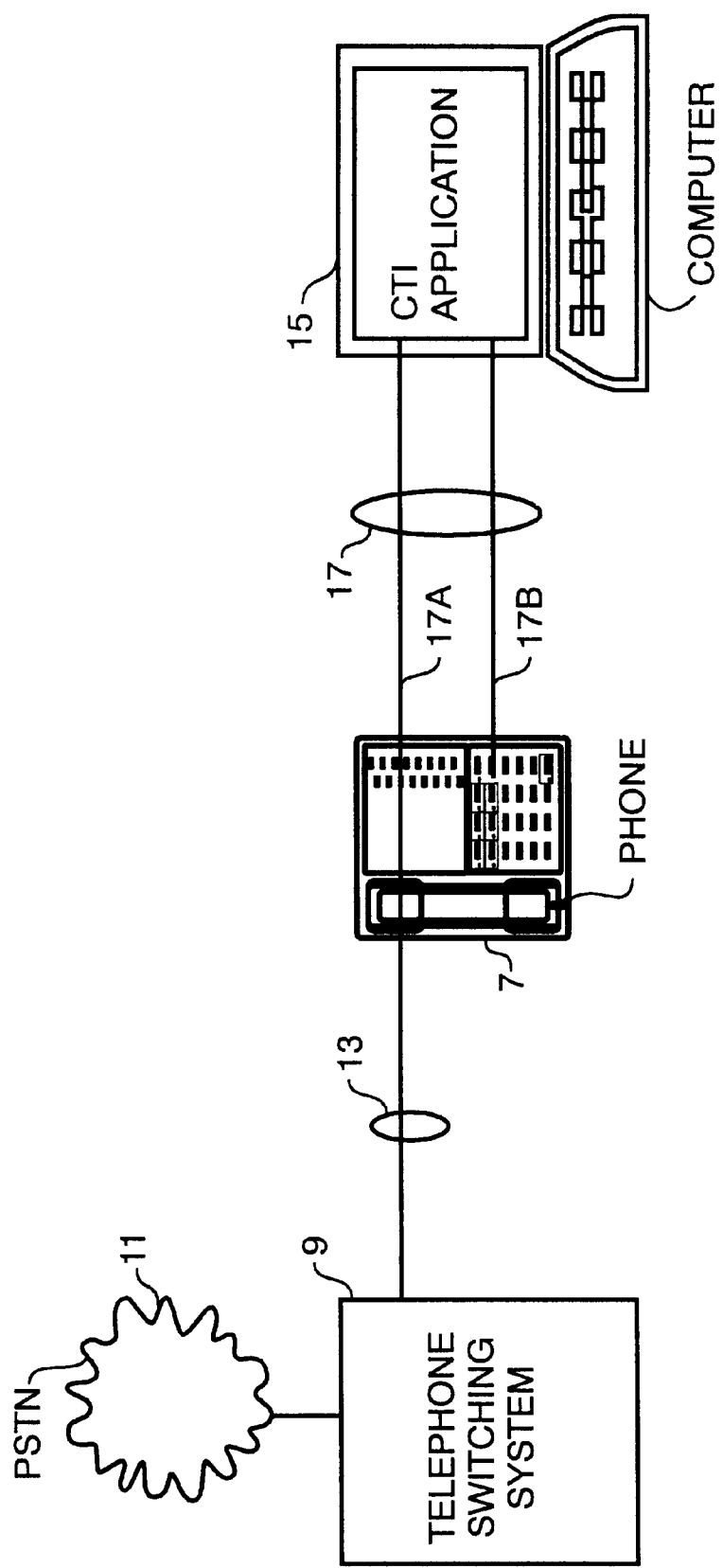

FIG. 3 illustrates a preferred embodiment of the present invention. A processor controlled telephone 7 is connected to a switching system 9, via a physical link 13 provided by digital network interfaces (DNIC) in the telephone 7 and in the switching system 9. The switching system 9 is connected to the public switched telephone network 11 in the usual and well known manner. The digital network interfaces provide well known 2B+D digital channels, wherein one or both of the B channels carries either digital voice or data signals. The D channel carries digital signalling signals.

The telephone 7 is also connected to a computer 15, preferably via a universal serial bus 17 (USB), which is an emerging defacto standard and low cost means of providing a number of separate logical connections between a host (in this case the computer 15) and a function (in this case the telephone 7).

In operation, the signalling signals (or signals which can be derived from the signalling signals but are referred to herein as signalling signals) carried in the D channel from the switching system 9 are relayed by a program in the telephone 7 to a telephone application program in the computer 15 via the bus 17, illustrated as bus portion 17A. The telephone application program in the computer generates its own telephone control signals, and applies them via bus portion 17B to the telephone 7.

A watchdog program in software or firmware in the processor controlled telephone 7 monitors bus portion 17B to detect the case in which the telephone application program is not operational. This could occur, for example, if operation of the telephone application program in foreground or background has failed, if the computer has crashed, if the computer is not operational in general, etc.

In the event the watchdog program has detected that the telephone application program is not operational, an operation program in the telephone ceases transmitting the signalling signals to the computer via bus portion 17A, and causes the telephone 7 to operate in direct response to the signalling signals received thereby as if the computer did not exist. Reliable operation of the telephone is thus achieved, upon failure of the computer.

Figure 4:
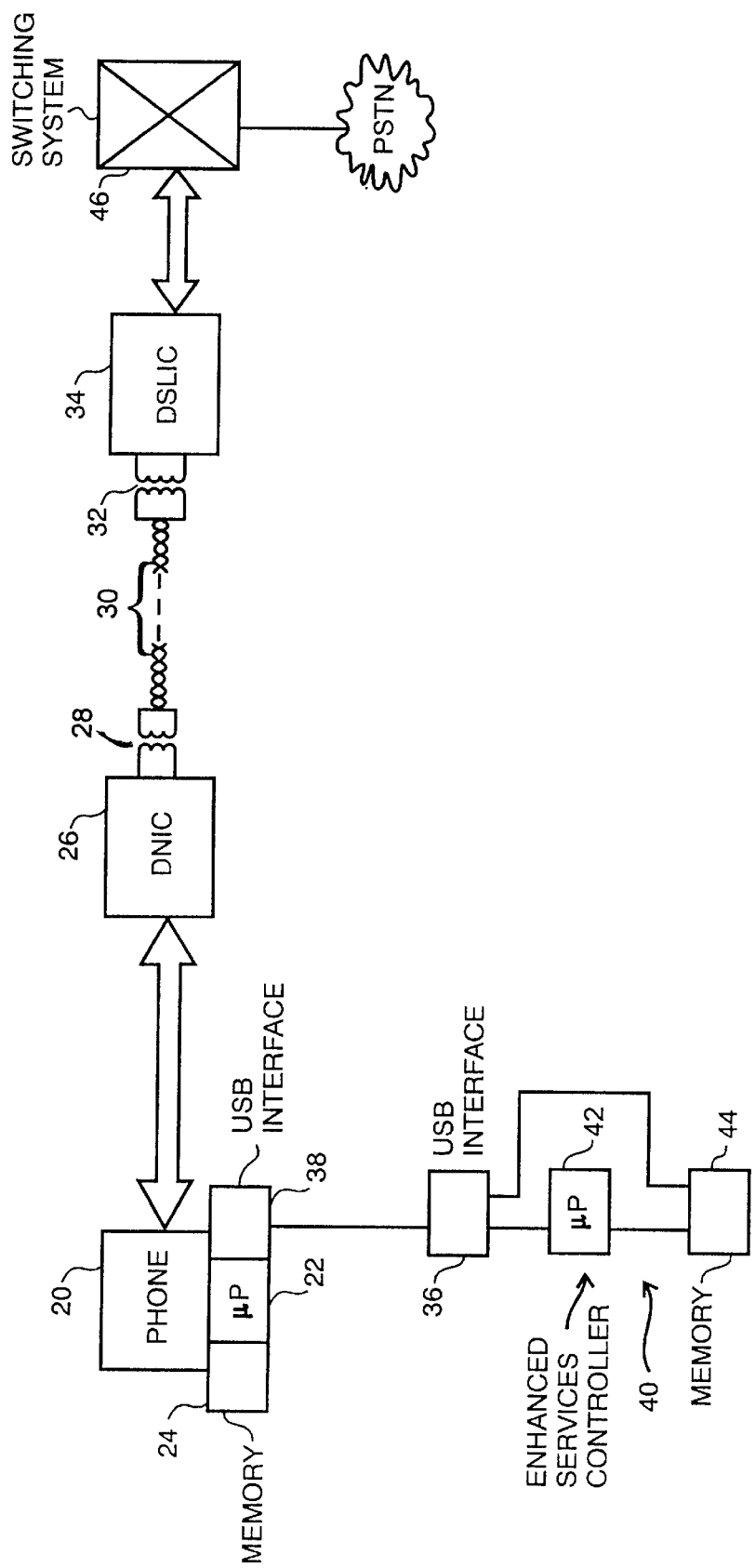

FIG. 4 illustrates a block diagram of the above system in more detail. A processor controlled telephone 20 can be constructed as described in the article "Digital Phone Design Using the MT8994/5B", Application Note MSAN-132, pages 15-197 to 15-219 and other documents referenced therein, Microelectronics Digital Communications Handbook, Issue 8, Copyright 1991, Mitel Semiconductor which is incorporated herein by reference. A microprocessor 22 is connected to the telephone 20 as described therein. Memory 24 is connected to the microprocessor 22 to store operation programs.

Figure 6:
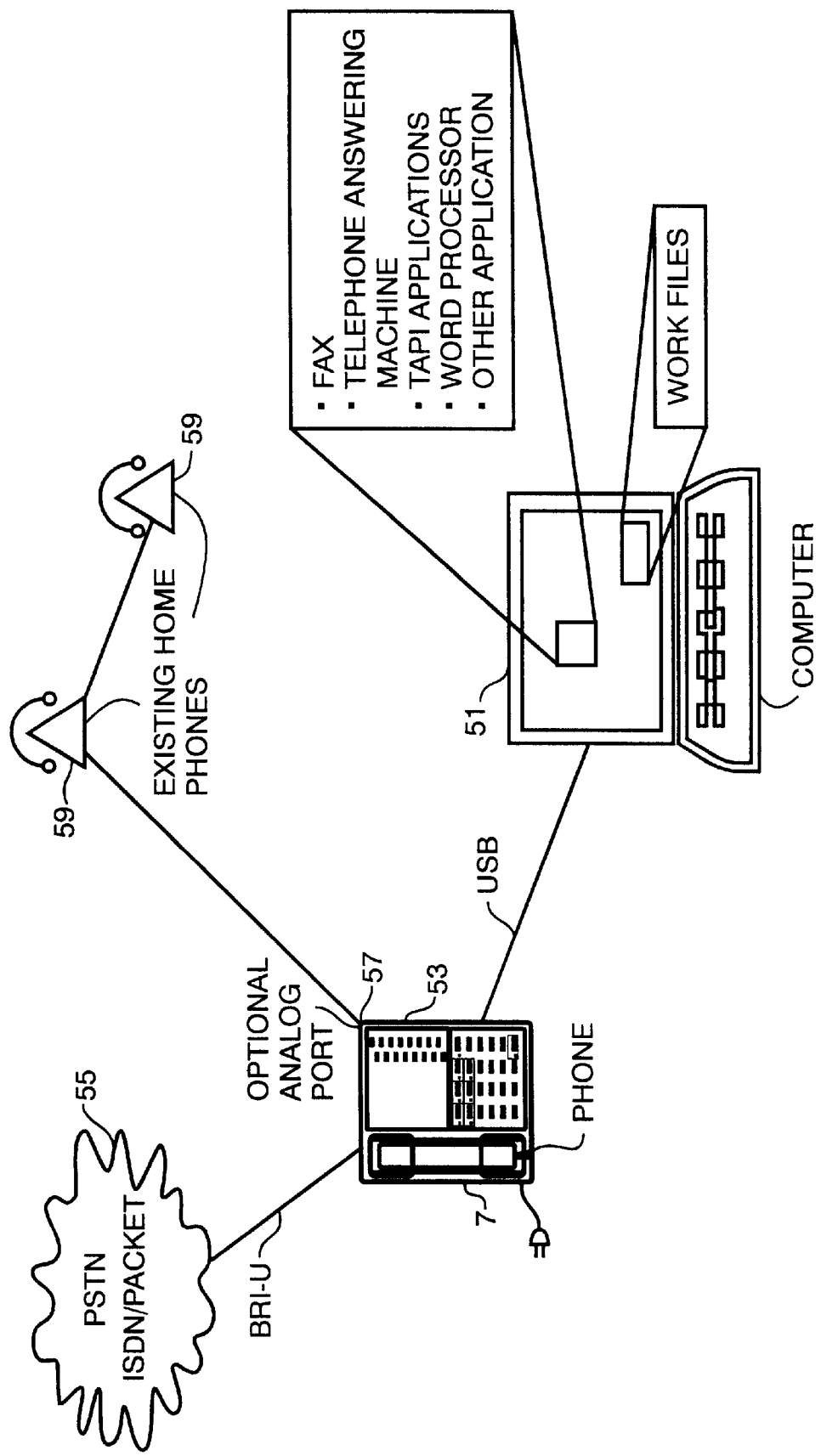

The telephone 20 is connected to digital network interface circuit (DNIC) 26, which can be for example Mitel Semiconductor part number MT8972, and as shown in FIG. 6, page 15-209 of the aforenoted article. The DNIC is described on pages 11-25 to 11-53 of the aforenoted Handbook, which are incorporated herein by reference.

As described in the first-noted article, the DNIC is connected through transformer 28 to the twisted wire pair 30. The twisted pair is connected through transformer 32 to a digital subscriber line interface circuit (DSLIC) 34, such as Mitel Semiconductor part MT8910 described in data sheets on pages 9-3 to 9-30 of the aforenoted Handbook, and which are incorporated herein by reference.

Together, the DNIC to DSLIC communication path carry and communicate via the 2B+D channels described above. The DSLIC 34 is connected to the line input port (not shown) of a switching system 46. The switching system can for example be type SX-2000 PABX sold by Mitel Corporation, and which is described in U.S. Pat. Nos. 4,615,028 issued Sep. 30, 1986 and 4,616,360 issued Oct. 7, 1986, both being assigned to Mitel Corporation.

An enhanced services controller 40, preferably formed of a personal computer, and comprising microprocessor 42 to which memory 44 is connected, is connected to universal serial bus (USB) interface 36. (USB) interface circuit 38 is connected to the microprocessor 22. Serial data is transferred between the USB interfaces 36 and 38. The USB interface circuit can have direct memory access to memory 44.

Figure 5:
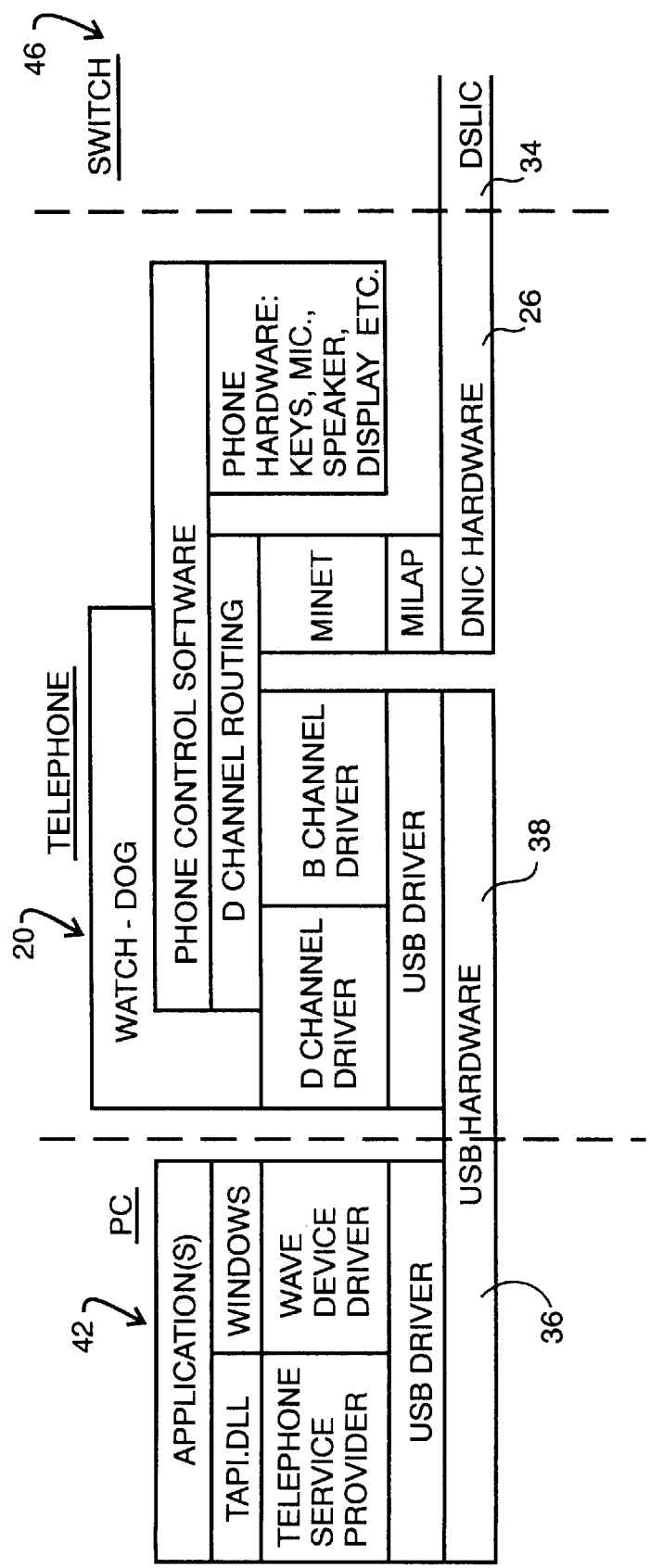

Operation of the above will be described with the aid of FIG. 5, which shows in block form the program arrangement. The programs illustrated in block form in computer block 42 (to the left of the left-hand dashed line) are a USB hardware driver and a telephone service provider layer operating under a TAPI.DLL HMI program as well as a WAVE device driver operating under a Windows HMI program. These programs are stored in memory 44.

The programs illustrated in block form in telephone block 20 between the two vertical dashed lines are telephone control software programs stored in memory 24 which include channel routing programs including a USB hardware driver, higher level D and B channel drivers for controlling data to be carried by USB hardware 38, and MiNet and MiLap programs for controlling data passing via the DNIC 26 to and from the switching system 46 (shown to the right of the right-hand dashed line). The telephone control software programs also are responsive to the telephone hardware, such as keys, microphone, speaker, display, etc.

Watchdog software or firmware monitors signals for control of the telephone received from the computer 42 via the USB hardware 38.

In normal operation, call control signals carried in the D-channel from the switching system 46 are received via the DNIC and DSLIC by the telephone control software processed by microprocessor 22 and stored in memory 24. The call control signals are relayed under control of microprocessor 22 and the D-channel driver and USB driver via USB hardware 38 and 36 to the telephony service provider software in the TAPI application in the microprocessor 42.

Because different low level protocols are running over the DNIC and USB links, the interface connection in software is preferably made part way up the protocol stack.

This connection should also be made at a point in the protocol so that failure of the computer will be transparent to the switching system. For example, message sequenced numbers in the link layer is preferably kept synchronized to avoid dropping completed calls.

The watch-dog program preferably also sends requests to the computer via the USB link to confirm availability and sanity of the application, preferably once each millisecond.

In normal operation, all message or signalling traffic having a termination designation on physical attributes of the telephone, i.e. buttons, display, ringer, microphone, speaker control, etc., should be transmitted to the computer telephony service provider program. The computer may in turn simply return this to the logical D-channel, or it may act upon this traffic in some other way determined by the specifics of the service provider program (more particuarly the application program(s).

However in the event that the watchdog determines that an application is no longer in control, then this information is provided by the watchdog to the telephone control software program operated by the telephone 20 microprocessor 22. The telephone control software program then ceases transmitting the D-channel data to the computer, and controls direct operation of the hardware of the telephone from signalling signals received via the D-channel from the switching system 46 via the DNIC-DSLIC link.

The watchdog, which is preferably implemented as a telephone firmware function, continues to monitor the enhanced services controller 40 (computer 42), by continuously sending sanity check enquiries (e.g. once per millisecond) via the USB link, and upon determining the presence of a running TAPI application program, causes the telephone control software program to restore control to the TAPI application program.

Similarly, the B-channel or channels may be routed directly to the telephone transducers (i.e. handset or microphone/speaker) or to the enhanced services controller 42. This routing, similar to the D-channel, is first determined by the watchdog. If it determines that no computer TAPI application program is in control, then the B-channels are connected to the telephone as if no enhanced services controller were present.

In normal CTI operation, routing of the B-channel or channels is under control of the computer TAPI application, which instructs the telephone control software program as is necessary. For normal speech this connection is made exactly as if no enhanced services controller were present. However, for example if the telephone is not answered then the application may route the appropriate B-channel via the USB link and an expansion bus (not shown) connected to the microprocessor 42 to and from a computer disk drive, or to and from a digital signal processor (DSP) which implements a voice messaging function or recorded announcement.

It should be noted that the link between the switching system and the telephone could alternatively be ISDN basic rate, analog, analog/CLASS, multi-line analog, control over voice (COV) or some other proprietary transmission scheme. The link between the telephone and the computer could alternatively be GeoPort (an Apple Computer Corp transmission standard), RS-232 (for the D-channel), or any other serial or parallel type link.

FIG. 6 illustrates a home office telephone architecture, wherein the functions other than voice, basic voice services and an ISDN physical termination are implemented in a computer 51. The computer is connected via the aforenoted USB link to a telephone 53, which is connected via an ISDN or packet link to the public switched telephone network 55. The telephone shown in FIG. 6 contains an optional analog port 57 to which existing analog home telephones 59 are connected. To the computer, the telephone provides nothing more than signal transport, a function that is provided today by known network interface circuit boards that can be plugged into the expansion slot of a computer.

It should be noted that the telephone in FIG. 6 can be a housing which merely interconnects a handset, a dial, the switch, and the computer. Such a housing is known as a "dongle". The architecture described herein could be used to implement a dongle.

A person understanding this invention may now conceive of alternative structures and embodiments or variations of the above. For example, the BRI-U link to the public switched telephone network could be one or more analog telephone lines. All of those which fall within the scope of the claims appended hereto are considered to be part of the present invention.

I claim:

1. A method of operating a computer controlled telephone set comprising:

transmitting telephone call installing signals to an enhanced services controller, controlling the telephone set by monitoring the enhanced services controller, monitoring operation of the enhanced services controller and in the event of detection that the enhanced services controller is not operational, controlling the telephone set directly by said signalling signals.

2. A computer controlled telephone apparatus comprising:

(a) a micro-processor controlled telephone set, having a memory and interface means, (b) a digital network interface connection (DNIC) for interfacing the telephone set to a telephone network, (c) a computer for providing enhanced services control for the telephone set, comprising a stored telephony service program for receiving call control signals from the DNIC, and for controlling operation of functions of the telephone set in accordance with said stored telephony service program; and (d) a watch dog program in the telephone set for monitoring operation of said telephony service program and in the event there is faulty operation of the telephone service program, causing direct connection of the telephone set to the DNIC.

3. The telephone apparatus as defined in claim 2 in which the DNIC is comprised of a switching means, a signalling channel and a voice channel between the telephone set and the switching means, the signalling channel being logically routed via universal serial bus (USB) to the computer.

4. The telephone apparatus as defined in claim 2 said digital network interface circuits (DNIC) in the telephone set and switching means in mutual communication carrying digital voice signals in a B channel and digital signalling signals in a D channel.

5. The telephone apparatus as defined in claim 3 including analog interface circuits in the telephone set and switching means in mutual communication carrying analog forms of voice and signalling signals.

6. The telephone apparatus as defined in claim 3 including ISDN BRI U and S interface circuits in the telephone set and switching means in mutual communication carrying digital voice signals and digital signaling signals.

* * * * *